(12) United States Patent
Denis (10) Patent No.: US 11,097,371 B2
(45) Date of Patent: Aug. 24, 2021

(54) SYSTEM AND METHOD FOR COMMUNICATION WITH WELDING GAS LINE

(71) Applicant: Illinois Tool Works Inc., Glenview, IL (US)

(72) Inventor: Marc Lee Denis, Lena, WI (US)

(73) Assignee: Illinois Tool Works Inc., Glenview, IL (US)

( * ) Notice: Subject to any disclaimer, the term of this patent is extended or adjusted under 35 U.S.C. 154(b) by 129 days.

(21) Appl. No.: 16/167,780

(22) Filed: Oct. 23, 2018

(65) Prior Publication Data

US 2019/0054560 A1 Feb. 21, 2019

Related U.S. Application Data (63) Continuation of application No. 14/575,136, filed on Dec. 18, 2014, now Pat. No. 10,105,785.

(51) Int. Cl.
*B23K 9/32* (2006.01)
*B23K 9/10* (2006.01)
*B23K 9/095* (2006.01)

(52) U.S. Cl.
CPC .............. *B23K 9/325* (2013.01); *B23K 9/095* (2013.01); *B23K 9/1087* (2013.01)

(58) Field of Classification Search
CPC ...... B23K 9/10; B23K 9/1062; B23K 9/1087; B23K 9/0953; B23K 9/16; B23K 9/325; B23K 9/0956; B23K 9/095; B23K 37/00; B23K 9/1006
See application file for complete search history.

(56) References Cited

U.S. PATENT DOCUMENTS

| | | | |
|---|---|---|---|
| 7,247,814 B2 | 7/2007 | Ott | |
| 2006/0213892 A1* | 9/2006 | Ott | B23K 9/16 219/132 |
| 2007/0300277 A1* | 12/2007 | Lobbert | H04L 12/2803 725/118 |
| 2008/0116185 A1 | 5/2008 | Luck et al. | |
| 2011/0248856 A1 | 10/2011 | Obenchain | |
| 2013/0119036 A1* | 5/2013 | Daniel | B23K 9/095 219/130.21 |
| 2013/0279561 A1* | 10/2013 | Jin | H04L 25/4902 375/239 |

(Continued)

FOREIGN PATENT DOCUMENTS

| | | |
|---|---|---|
| CN | 102596477 | 7/2012 |
| CN | 102639275 | 8/2012 |
| CN | 103958107 | 7/2014 |

OTHER PUBLICATIONS

Erickson, Pipelines as Communication Network Links, Mar. 14, 2005, pp. 1-50, Cited in Parent Application (Year: 2005).*

(Continued)

*Primary Examiner* — Brian W Jennison
(74) *Attorney, Agent, or Firm* — McAndrews, Held & Malloy, Ltd.

(57) ABSTRACT

A welding system includes a gas line coupled to components of the welding system and a first gas line transducer coupled to the gas line. The gas line is configured to convey a gas between components of the welding system. The first gas line transducer is configured to communicate via radio signals transmitted through the gas line.

20 Claims, 3 Drawing Sheets

(56) References Cited

U.S. PATENT DOCUMENTS

2014/0263227 A1    9/2014   Daniel

OTHER PUBLICATIONS

International Search Report from PCT application No. PCT/US2015/056124, dated Feb. 5, 2016, 10 pgs.
Erickson, "Pipelines as Communication Network Links," Mar. 14, 2005, pp. 1-50.

* cited by examiner

SYSTEM AND METHOD FOR COMMUNICATION WITH WELDING GAS LINE

CROSS-REFERENCE TO RELATED APPLICATIONS/INCORPORATION BY REFERENCE

This application is a continuation of U.S. patent application Ser. No. 14/575,136 filed Dec. 18, 2014, now U.S. Pat. No. 10,105,785, which is hereby incorporated herein by reference.

BACKGROUND

The present disclosure relates generally to wireless communications and, more particularly, to systems and methods for wireless communications utilizing a welding gas line of a welding system.

Welding is a process that has increasingly become utilized in various industries and applications. Such processes may be automated in certain contexts, although a large number of applications continue to exist for manual welding operations. In both cases, such welding operations rely on communication between a variety of types of equipment (e.g., devices) to ensure that welding operations are performed properly.

Certain welding systems may include devices that communicate with each other using wired communication, while other welding systems may include devices that communicate with each other using wireless communication. Wireless communications among devices of a welding system may be affected by objects (e.g., walls) disposed along a communications path between devices, distance between devices, or other nearby wireless communication systems. Wired communications among devices of a welding system utilizing one or more dedicated communications cables add bulk to the welding system, and weld cables may not be utilized for communications during welding.

BRIEF DESCRIPTION

Certain embodiments commensurate in scope with the present disclosure are summarized below. These embodiments are not intended to limit the scope of the present disclosure, but rather these embodiments are intended only to provide a brief summary of possible forms of the present disclosure. Indeed, the present disclosure may encompass a variety of forms that may be similar to or different from the embodiments set forth below.

In another embodiment, a welding system includes a gas line coupled to components of the welding system and a first gas line transducer coupled to the gas line. The gas line is configured to convey a gas between components of the welding system. The first gas line transducer is configured to communicate via radio signals transmitted through the gas line.

In another embodiment, a welding system includes a first component of the welding system having communications circuitry and a gas port. The gas port is configured to convey a gas for a welding or cutting operation. The welding system also includes a first gas line transducer coupled to the communications circuitry. The first gas line transducer is configured to transmit radio signals into the gas port, the first gas line transducer is configured to receive radio signals from a second component of the welding system, and the received radio signals are conveyed by a gas line coupled to the gas port.

In another embodiment, a method of communicating between components of a welding system includes transmitting radio signals into a gas line coupled between components of the welding system, internally reflecting a portion of the radio signals within the gas line between a first end and a second end of the gas line, and receiving the portion of the radio signals. The radio signals are transmitted into the gas line proximate to the first end of the gas line. The received radio signals correspond to data settings of the components of the welding system.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the present disclosure. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
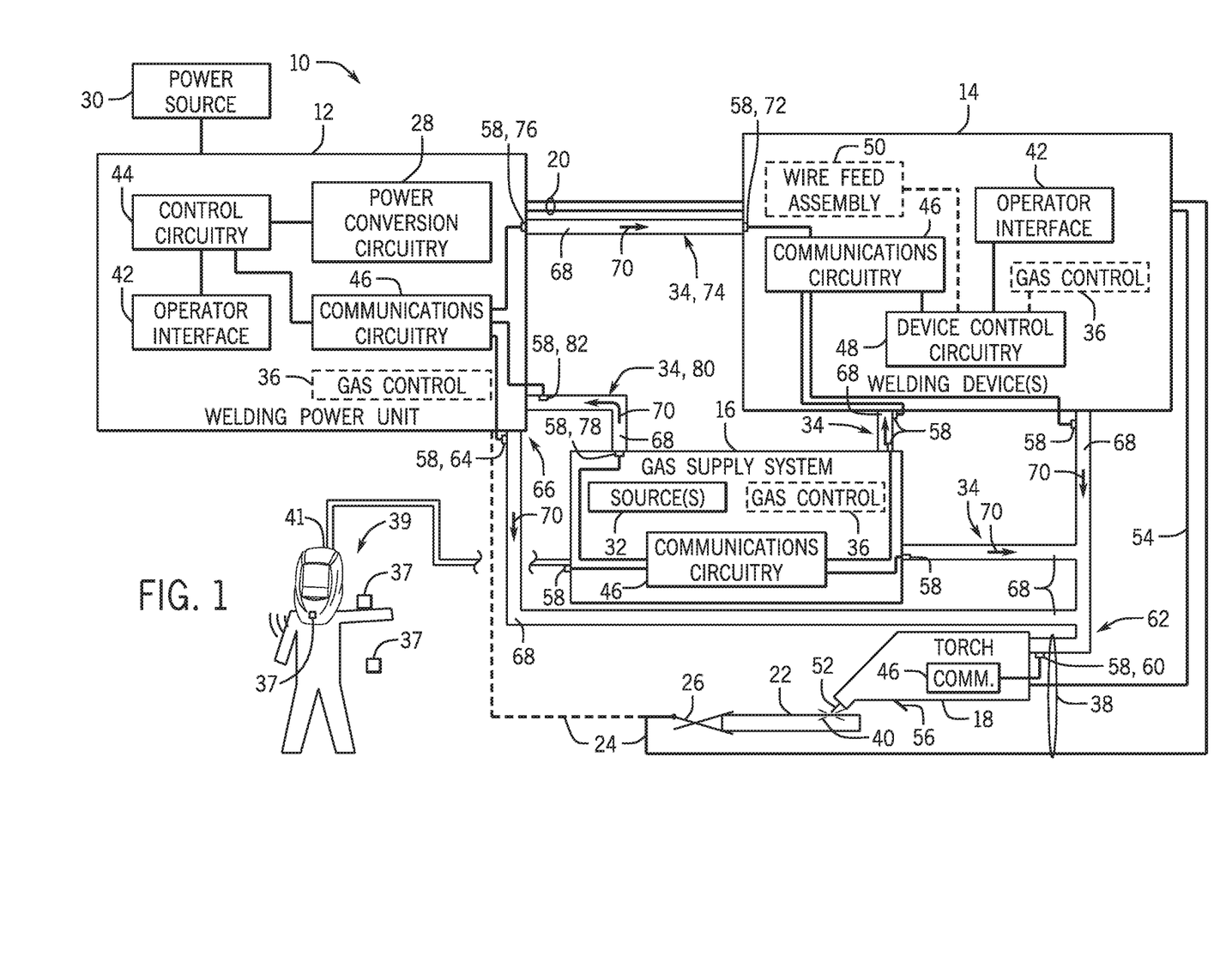
FIG. 1 illustrates an embodiment of a welding system with wireless communication transducers for gas line communication.

Turning to the figures, FIG. 1 illustrates an embodiment of a welding system 10 (e.g., a gas metal arc welding (GMAW) system) where a welding power unit 12 and one or more welding devices 14 may be utilized together in accordance with aspects of the present disclosure. It should be appreciated that, while the present discussion may focus specifically on the GMAW system 10 illustrated in FIG. 1, the presently disclosed methods may be used in systems using any arc welding process with a gas line (e.g., FCAW, FCAW-G, GTAW (i.e., TIG), or similar arc welding process, plasma cutting). Furthermore, although the present application specifically relates to communications among welding devices, the communication methods provided herein may be applied to any two devices utilized together with a gas line.

As illustrated, the welding system 10 includes the welding power unit 12, the welding device 14 (e.g., a welding wire feeder, remote device, pendant, remote control, welding sensor), a gas supply system 16, and a welding torch 18. In some embodiments, the welding device 14 includes a pneumatic tool, such as a grinder, a stapler, a nailer, a drill, and so forth. The welding power unit 12 generally supplies welding power (e.g., voltage, current, etc.) for the welding system 10, and the welding power unit 12 may be coupled to the welding device 14 via a cable bundle 20 as well as coupled to a workpiece 22 using a work cable 24 having a clamp 26. The work cable 24 may be integrated with or separate from the cable bundle 20.

The welding power unit 12 may include power conversion circuitry 28 that receives input power from a power source 30 (e.g., an AC power grid, an engine/generator set, or a combination thereof), conditions the input power, and provides DC or AC output power via the cable bundle 20. As such, the welding power unit 12 may power the welding device 14 that, in turn, powers the welding torch 18, in accordance with demands of the welding system 10. The work cable 24 terminating in the clamp 26 couples the welding power unit 12 to the workpiece 22 to close the circuit between the welding power unit 12, the workpiece 22, and the welding torch 18. The power conversion circuitry 28 may include circuit elements (e.g., transformers, rectifiers, switches, boost converters, buck converters, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10.

The illustrated welding system 10 includes the gas supply system 16 that supplies a gas or gas mixtures from one or more shielding gas sources 32 to the welding torch 18. The gas supply system 16 may be directly coupled to the welding power unit 12, the welding device 14, and/or the torch 18 via a gas line 34. A gas control system 36 having one or more valves respectively coupled to the one or more gas sources 32 may regulate the flow of gas from the gas supply system 16 to the welding torch 18. The gas control system 36 may be integrated with the welding power unit 12, the welding device 14, or the gas supply system 16, or any combination thereof. That is, components of the welding system 10 that receive gas from the gas supply system 16 may control flows of the gas through the respective component via the gas control system 36.

A gas supplied from the gas supply system 16, as discussed herein, may refer to any gas or mixture of gases that may be provided to the arc and/or weld pool in order to provide a particular local atmosphere (e.g., to shield the arc, improve arc stability, limit the formation of metal oxides, improve wetting of the metal surfaces, alter the chemistry of the weld deposit relative to the filler metal and/or base metal, form a plasma cutting arc, and so forth). In general, the gas is provided at the time of welding or cutting, and the gas may be turned on immediately preceding the weld and/or for a short time following the weld. The gas flow may include, but is not limited to, argon (Ar), helium (He), carbon dioxide ($CO_2$), oxygen ($O_2$), nitrogen ($N_2$), similar suitable shielding gases, any mixtures thereof, or a breathable gas. For example, a gas flow (e.g., delivered via gas line 34) may include Ar, $Ar/CO_2$ mixtures, $Ar/CO_2/O_2$ mixtures, Ar/He mixtures, and so forth. The gas flow may be provided by one or more tanks. In some embodiments, the gas supply system 16 includes a compressor configured to compress an air flow of the ambient environment to provide as the gas flow.

In some circumstances, it may be useful to monitor certain environmental and/or operator readings related to operator health (e.g. biometric readings). Accordingly, sensors 37 (e.g., temperature sensors, gas composition sensors, light sensors) may be coupled to the welding power unit 12, the welding device 14, the gas supply system 16, or the torch 18, or any combination thereof. For example, the sensors 37 may additionally include biometric sensors 37 disposed on a operator 39, such as pulse oximetry sensors, temperature sensors, "fitness" type sensors (e.g., heart rate, activity monitors), and the like. The sensors 37 may include wireless and/or wired sensors communicatively coupled to the communications circuitry 46 of one or more components of the welding system 10. In this manner, environmental and/or health data (e.g., biometric readings) related to the welding operator 37 may be communicated within the welding system 10. In some embodiments, the welding device 14 is a welding helmet 41 with one or more sensors 37. Moreover, the welding helmet 41 may receive a breathable gas (e.g., ambient air, oxygen, oxygen/nitrogen mixture) from the gas supply system 16.

In the illustrated embodiment, the welding device 14 is coupled to the welding torch 18 via a cable bundle 38 in order to supply consumables (e.g., gas, welding wire) and welding power to the welding torch 18 during operation of the welding system 10. In another embodiment, the cable bundle 38 may only provide welding power to the welding torch 18. During operation, the welding torch 18 may be brought near the workpiece 22 so that an arc 40 may be formed between the consumable welding electrode (i.e., the welding wire exiting a contact tip of the welding torch 18) and the workpiece 22. As discussed in detail below, gas line transducers coupled to the gas line 34 may enable communication between components of the welding system 10 during operation of the torch 18 (e.g., when the arc 40 is formed).

The welding system 10 is designed to allow for data settings (e.g., weld parameters, weld process, and so forth) to be selected or input by the operator, particularly via an operator interface 42 provided on the welding power unit 12. The operator interface will typically be incorporated into a front faceplate of the welding power unit 12, and may allow for selection of settings. The selected settings are communicated to control circuitry 44 within the welding power unit 12. The control circuitry 44, described in greater detail below, operates to control generation of welding power output from the welding power unit 12 that is applied to the welding wire by the power conversion circuitry 28 for carrying out the desired welding operation. The control circuitry 44 may control the power conversion circuitry 28 based at least in part on data settings received via the operator interface 42, data settings received via communications circuitry 46 of the welding power unit 12, or any combination thereof. As discussed in detail below, the data settings received via the communications circuitry 46 may be received via a wired and/or wireless connection with one or more networked devices, such as another welding power unit 12, welding device 14, gas supply system 16, torch 18, a sensor, a workstation, a server, and so forth, or any combination thereof. As discussed in detail below, one or more of the components of the welding system 10 may include communications circuitry 46 to facilitate communication among the components of the welding system 10. For example, the welding power unit 12, the one or more welding devices 14, the gas supply system 16, and the torch 18 may each have communications circuitry 46. In some embodiments, the communications circuits 46 and operator interfaces 42 may enable data settings (e.g., wire feed speeds, weld processes, currents, voltages, arc lengths, power levels) to be set on one or more components of the welding system 10, such as the welding power unit 12, the one or more welding devices 14, the gas supply system 16, the torch 18, or any combination thereof. Additionally, or in the alternative, data settings stored in a memory and/or a database may be transmitted to the communications circuitry 46 from a computer, a workstation, a server, or any combination thereof.

Device control circuitry 48 of the one or more welding devices 14 may control various components of the respective welding device 14. In some embodiments, the device control circuitry 48 may receive input from an operator interface 42 of the welding device 14 and/or input from the communications circuitry 46 of the welding device 14. The one or more welding devices 14 may include a wire feeder having a wire feed assembly 50 controlled by the device control circuitry 48. The wire feed assembly 50 may include, but is not limited to, a motor, drive wheels, a spool, power conversion circuitry, or any combination thereof. The device control circuitry 48 may control the feed of welding wire from the spool to the torch 18 in accordance with input received via the operator interface 42 or the communications circuitry 46 for a desired welding application. In some embodiments, the operator interface 42 of the welding device 16 may enable the operator to select one or more weld parameters, such as wire feed speed, the type of wire utilized, the current, the voltage, the power settings, and so forth.

During a welding application, power from the welding power unit 12 is applied to an electrode 52 (e.g., wire), typically by means of a weld cable 54 of the cable bundle 38 coupled to the torch 18. Similarly, gas via the gas line 34 may be fed through the cable bundle 38 to the torch 18. In some embodiments, the wire 42 is advanced through the cable bundle 38 towards the torch 18 during welding operations. When a trigger switch 56 on the torch 18 is actuated, communications circuitry 46 in the torch 18 may be configured to provide a signal (e.g., via gas line communication) to the welding power unit 12, the welding device 14, or the gas supply system 16, or any combination thereof, thereby enabling the welding process to be started and stopped by the operator. That is, upon depression of the trigger switch 56, gas flow is begun, a wire may be advanced, and power is applied to the weld cable 54 and through the torch 16 for the welding application. In some embodiments, the communications circuitry 46 in the torch 18 may facilitate communication between the torch 18 and other components of the welding system 10 during the welding application.

Components of the welding system 10 may communicate with one another via gas line communication as discussed herein. The communications circuitry 46 of a first component (e.g., the welding power unit 12, the welding device 14, the gas supply system 16, the torch 18) may communicate with the communications circuitry 46 of a second component (e.g., the welding power unit 12, the welding device 14, the gas supply system 16, the torch 18) via gas line transducers 58 coupled to a gas line 34 disposed between the first component and the second component. For example, a first gas line transducer 60 disposed near a first end 62 of the gas line 34 proximate to the torch 18 may communicate via the gas line 34 with a second gas line transducer 64 disposed near a second end 66 of the gas line 34 proximate to the welding power unit 12. The gas line transducers 58 may transmit and/or receive radio signals along the gas line 34, where the gas line 34 is utilized as a wave guide to direct radio signals between gas line transducers 58. That is, the first gas line transducer 60 may transmit radio signals towards an interior 68 of the gas line 34, which internally reflects at least a portion of the radio signal that may be received by the second gas line transducer 64. The gas line transducers 58 may communicate in the same or opposite direction of a gas flow 70 within the gas line 34. Moreover, the gas line transducers 58 may communicate regardless of whether gas is substantially idle or flowing through the gas line 34. In some embodiments, each gas line transducer 58 may transmit and receive radio signals.

The gas line transducers 58 may communicate using one or more types of wireless communication standards (e.g., an IEEE 802.11x-based Wi-Fi wireless standard, an IEEE 802.15.1 Bluetooth wireless standard, an IEEE 802.15.4 Zigbee™ wireless standard, a cellular network standard, or any other wireless communication standard). For example, a cellular wireless communication channel may communicate via standards including, but not limited to, the code division multiple access (CDMA) standard, the Global System for Mobile Communications (GSM) standard, or any combination thereof. The gas line transducers 58 may communicate via wireless signals having frequencies between approximately 3 MHz to 45 GHz, approximately 2 GHz to 40 GHz, or approximately 28 GHz to 35 GHz.

As discussed above, the communications circuitry 46 may facilitate the communication of data settings (e.g., weld parameters, wire feed speed, the type of wire utilized, the current, the voltage, the power settings) among components of the welding system 10. The gas line transducers 58 of the welding system 10 may communicate with other gas line transducers 58 of the welding system via the gas lines 34. For example, the operator may adjust weld parameters via the operator interface 42 of the welding device 14 (e.g., wire feeder), and the communications circuitry 46 of the welding device 14 may transmit wireless signals from a third gas line transducer 72 through a gas line 74 coupled to the welding power unit 12, where a fourth gas line transducer 76 receives the wireless signals based at least in part on the adjusted weld parameters.

The communications circuitry 46 of the welding system 10 may utilize gas line transducers 58 exclusively or in addition to wired (e.g., 14-pin, weld cable communication (WCC)) or wireless connections. For example, the communications circuitry 46 of the welding device 14 may communicate via a wired or wireless (e.g., through ambient environment or gas line) connection with communications circuitry 46 of the gas supply system 16, which in turn relays the adjusted weld parameters to the welding power unit 12 via a fifth gas line transducer 78 through a gas line 80 to a sixth gas line transducer 82.

The gas line transducers 58 enable communication between components of the welding system 10 without the addition of separate communication pathways. Moreover, gas line transducers 58 may communicate regardless of whether the operator is welding and/or cutting with the torch 18. That is, the gas line transducers 58 facilitate communication between components of the welding system 10 when weld power along the weld cable 54 is modulated while the arc 40 is present. Moreover, gas line transducers 58 enable communication between components of the welding system 10 that may be spatially separated and/or arranged with objects (e.g., walls, roofs, floors, buildings) that may obstruct a line-of-sight between components of the welding system 10. Additionally, or in the alternative, wireless signals transmitted through the gas line 34 via the gas line transducers 58 may attenuate less and/or affect other wireless signals less than wireless signals openly transmitted through the environment about the welding system 10. Furthermore, in some embodiments the propagation characteristics (e.g., signal strength) of wireless signals transmitted via the gas line transducers 58 may be substantially constant for a given length of the gas line 34 regardless of objects disposed between components of the welding system 10.

Figure 2:
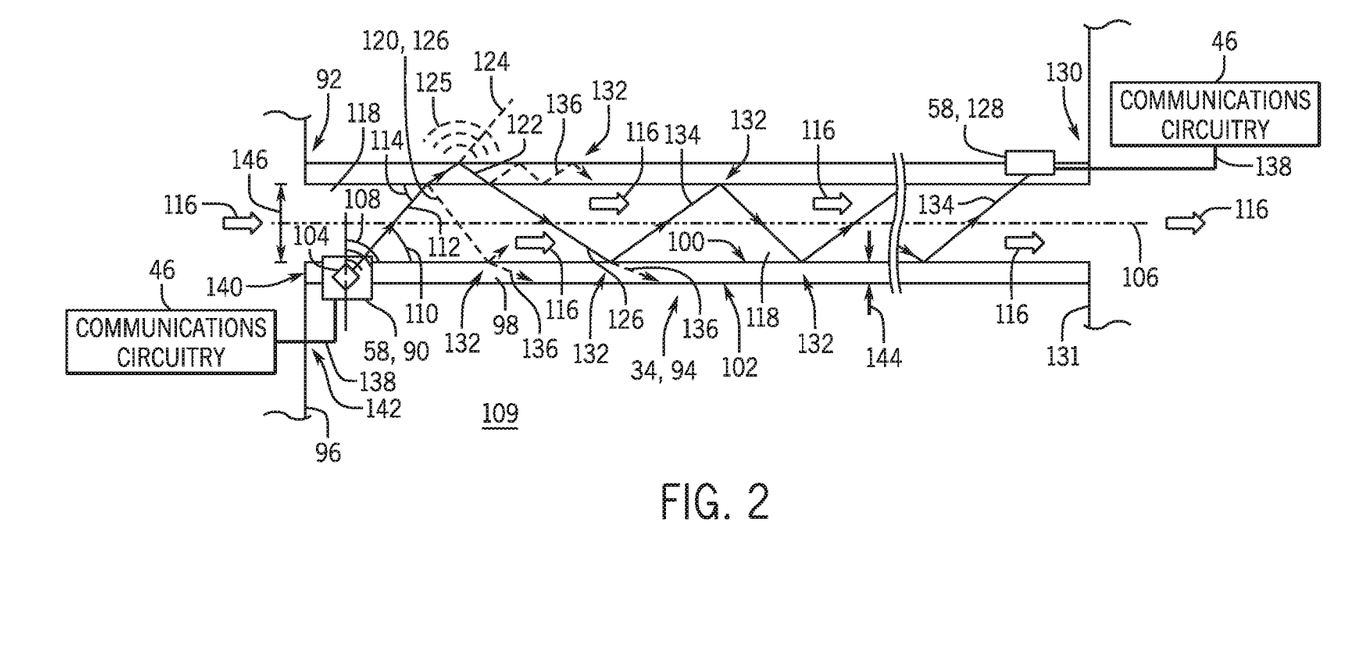
FIG. 2 illustrates a cross-sectional view of an embodiment of a gas line with wireless communication transducers.

FIG. 2 illustrates a cross-sectional view of an embodiment of gas line communication via gas line transducers 58 coupled to the gas line 34. A first gas line transducer 90 is coupled to a first end 92 of a gas line 94, proximate to a first component 96 (e.g., welding power unit 12, welding device 14, gas supply system 16, torch 18). In some embodiments, the first gas line transducer 90 is disposed at least partially within a wall 98 of the gas line 94. In some embodiments, the first gas line transducer 90 is disposed on an inner surface 100 or an outer surface 102 of the wall 98. An emitter 104 of the first gas line transducer 90 emits radio signals 108 at least partially towards an axis 106 of the gas line 94. The emitter 104 may be a directional emitter oriented towards the axis 106, thereby reducing energy emitted to an external environment 109 about the gas line 94. The emitter 104 may be oriented at an angle 110 relative to the inner wall 100 of the gas line 94 where the first gas line transducer 90 is disposed, such that emitted radio signals 108 are emitted as shown by arrow 112. The angle 110 of the emitter 104 may be selected and/or adjusted based at least in part on the material of the gas line 94, the geometry of the gas line 94, or any combination thereof, such that the attenuation of the emitted signal 112 transmitted via the gas line 94 is reduced.

The interaction of the emitted signal 112 with the wall 98 of the gas line 94 is affected by various properties of the emitted signal 112 (e.g., wavelength, received angle 114), a gas 116 within an interior 118 of the gas line 94, and the wall 98. For example, refractive indices of the gas 116 and the wall 98 affect a first quantity 120 of the emitted signal 112 that is reflected from the inner surface 100, a second quantity 122 of the emitted signal 112 that is reflected from the outer surface 102, and a third quantity 124 of the emitted signal 112 that is transmitted through the wall 98. The third quantity 124 of the emitted signal 112 transmitted through the wall 98 may radiate to the external environment 109, as shown by the dashed waves 125. The angle 110 of the emitter 104 may be selected to increase the first and/or second quantities 120, 124 and to reduce the third quantity 124 transmitted through the wall 98. Moreover, in some embodiments of the gas line transducer 58, the angle 110 of the emitter 104 may be adjusted when coupled to the gas line 94, thereby enabling the operator to tune the angle 110 of the emitter 104 to increase the internal reflection of the emitted signal 112 (e.g., the first and/or second quantities 120, 124). As may be appreciated, portions 126 (e.g., first quantity 120, second quantity 122) of the emitted signal 112 that are reflected by the inner surface 100 and the outer surface 102 towards the axis 106 may be received subsequently by a second gas line transducer 128 disposed proximate a second end 130 of the gas line 94. The second end 130 is coupled to a second component 131 that receives the gas 116. Moreover, the portions 126 of the emitted signal 112 may interact (e.g., reflect from, transmit through) with the wall 98 of the gas line 94 at multiple points 132 between the first and second gas line transducers 90, 128. For clarity, FIG. 2 illustrates a primary portion 134 of the emitted signal 112 with the solid arrow and secondary portions 136 of the emitted signal 112 that may be reflected within the gas line 94 with dashed arrows, and the second gas line transducer 128 is not limited to receiving only the primary portion 134 of the emitted signal 112. The second gas line transducer 128 is coupled to communications circuitry 46 of the second component 131 of the welding system 10. The gas line transducers 58 may be coupled to the respective communications circuitry 46 via a signal line 138 that is external from the gas line 94, internal to the gas line 94, or integrated with a connection 140 of the gas line 94 to the respective component. In some embodiments, the signal line 138 couples to the communications circuitry 36 via a communications port 142 or an input/output port of the respective component.

The material of the gas line 94 and/or the geometry (e.g., thickness 144, cross-section) of the gas line 94 may be selected to substantially reduce or eliminate attenuation of the emitted signal 112 emitted by the gas line transducers 58. The emitted signal 112 may attenuate via transmission out of the gas line 94 or absorption by the wall 98. In some embodiments, the material of the gas line 94 may be metallic (e.g., copper, aluminum, brass), non-metallic (e.g., rubber, vinyl, plastic), or any combination thereof, and the cross-sectional geometry of the gas line 94 may be circular, square, or rectangular, among other geometries. In some embodiments, the length of the gas line 94 between the first end 92 and the second end 130 is approximately 50, 100, 500, or 1000 times or more greater than an inner diameter 146 of the gas line 94. Moreover, the gas line 94 may be flexible, rigid, or have flexible and rigid sections. Attenuation of the emitted signal 112 through the gas line 94 (e.g., through the interior 118 or the wall 98) may be less than the attenuation of an emitted signal through the surrounding environment 109.

Radio signals may be readily transmitted and received through a gas line 94 where the frequency of the radio signal is greater than a cutoff frequency of the gas line 94, which may be based at least in part on the cross-sectional geometry of the gas line 94. For example, for gas lines with a circular cross-sectional geometry, the cutoff frequency ($f_{cutoff}$) may be approximated by Equation (1):

$$f_{cutoff} = c * 1.841/(2*\pi*r) \quad (1)$$

where c is the speed of light (e.g., 299,792,458 m/s) and r is the radius of the circular gas line 94. The gas lines 94 commonly utilized to supply gases for welding or cutting torches may have inner radii of approximately 0.125 inches (0.3175 cm), resulting in a cutoff frequency of approximately 27.7 GHz. In some embodiments, a gas line 94 may be an air hose coupled to a welding helmet 41, where the air hose is configured to supply breathable air to an operator. The air hose may have an inner radius of approximately 1.5 inches (3.81 cm), resulting in a cutoff frequency of approximately 2.3 GHz.

As discussed above, the angle 110 of the emitter 104 may be adjusted to affect the internally reflected portions of the emitted radio signal 112. In some embodiments, the angle 110 of the emitter 104 may be adjusted based at least in part on a material of the gas line 94, a cross-sectional geometry of the gas line 94, a wall thickness 144 of the gas line 94, the inner diameter 146 of the gas line 94, or a length of the gas line 94, or any combination thereof. For example, increasing the wall thickness 144 of the gas line 94 may enable the angle 110 to be increased.

Figure 3:
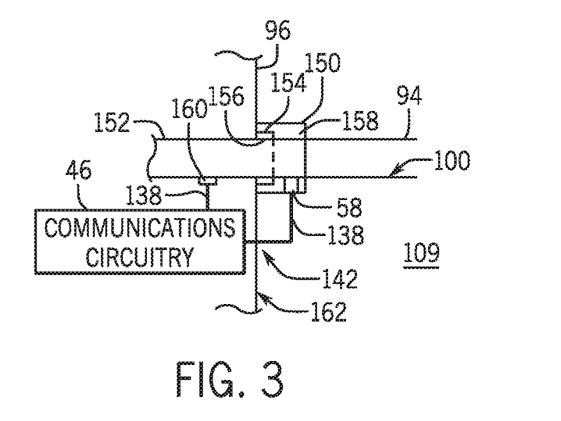
FIG. 3 illustrates an embodiment of wireless communication transducers and gas line fittings of a gas line.

FIG. 3 illustrates a cross-sectional view of embodiments of the gas line transducer 58 that transmits and/or receives radio signals through the gas line 94. In some embodiments, a gas line transducer may be incorporated with a connection fitting 150 of the gas line 94 that couples to a gas port 152 of the component 96 (e.g., welding power unit 12, welding device 14, gas supply system 16, torch 18). A first mating feature 154 of the connection fitting 150 couples with a second mating feature 156 (e.g., threads) of the gas port 152, thereby enabling gas to flow between the gas passage 94 and the gas port 152, and sealing the gas from the external environment 109. While FIG. 3 illustrates the first mating feature 154 as having a female geometry and the second mating feature 156 as having a male geometry, it may be appreciated that other embodiments of the first mating feature 154 may have a male geometry configured to couple with embodiments of the second mating feature 156 having a female geometry. In some embodiments, the gas line transducer 58 is at least partially integrated with a body 158 of the connection fitting 150 of the gas line 94. The gas line transducer 58 may be disposed on the inner surface 100 of the connection fitting 150 and the gas line 94.

In some embodiments, the communications circuitry 46 may be at least partially integrated with the component 96 rather than the gas line 94. For example, a gas line transducer 160 may be coupled to the gas port 152. In some embodiments, the gas line transducer 160 is at least partially disposed within the component 96. Additionally, or in the alternative, the gas line transducer 58 may be coupled to or partially integrated with the second mating feature 156 of the gas port 152. Accordingly, the gas line transducer 160 and signal line 138 may be disposed entirely within a housing 162 of the component 96, separate from the gas line 94.

Figure 4:
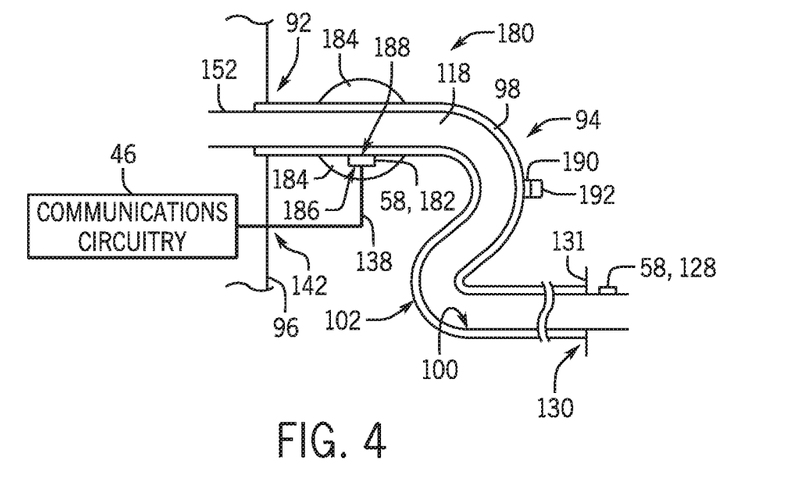
FIG. 4 illustrates an embodiment of wireless communication transducers and a gas line.

FIG. 4 illustrates a cross-sectional view of an embodiment of a gas line transducer 58 coupled to a body 180 of the gas line 94, where the body 180 is the portion of the gas line 94 that is between the ends 92, 130. An external gas line transducer 182 coupled to the body 180 of the gas line 94 may transmit radio signals into and receive emitted radio signals from the interior 118 of the gas line 94. In some embodiments, the external gas line transducer 182 is coupled to the body 180 via a wrap 184 or clamp about an outside surface 186 of the external gas line transducer 182. Additionally, or in the alternative, the external gas line transducer 182 may be coupled to the body 180 via an adhesive disposed between an inside surface 188 of the external gas line transducer 182 and the outer surface 102 of the gas line 94. In some embodiments, the external gas line transducer 182 may be inserted at least partially into the wall 98 of the gas line 94, thereby reducing the amount of the wall between the external gas line transducer 182 and the interior 118.

The emitter 104 of the external gas line transducer 182 may be oriented at an angle relative to the inner surface 100 of the gas line 94, as described above with FIG. 2. In some embodiments, the emitter 104 of the external gas line transducer 182 is oriented so that the transmitted radio signals refracted (e.g., ducted) through the wall 98 of the gas line 94 are internally reflected within the interior 118 and/or the wall 98, thereby enabling the gas line transducer 58 coupled to the second component 131 to receive the transmitted radio signals from the external gas line transducer 182.

In some embodiments, a supplementary external gas line transducer 190 may be coupled between the external gas line transducer 182 and the gas line transducer 128 coupled to the second component 131. The supplementary external gas line transducer 190 may receive emitted radio signals 112 with an attenuated signal strength and repeat the emitted radio signals 112 with an amplified signal strength, thereby increasing the range of communication along the gas line 94. The supplementary external gas line transducer 190 may be coupled to the communications circuitry 46 of the first component 96, to the communications circuitry 46 of the second component 131, or coupled to a separate power supply 192 (e.g., battery) to facilitate amplification of the emitted radio signals 112. Furthermore, embodiments of the supplementary external gas line transducer 190 may be coupled to the gas line 94 in a similar manner as described above with the external gas line transducer 182.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding system comprising:
   a gas line coupled to a plurality of components of the welding system, wherein the gas line is configured to convey a gas between the plurality of components of the welding system;
   a first gas line transducer coupled to the gas line, wherein the first gas line transducer is configured to transmit radio signals through the gas line to a plurality of gas line transducers located at the plurality of components connected via the gas line.

2. The welding system of claim 1, wherein the first gas line transducer is coupled to a fitting of the gas line at a first end of the gas line.

3. The welding system of claim 1, wherein the first gas line transducer is coupled to a body of the gas line.

4. The welding system of claim 3, wherein the first gas line transducer is mounted at least partially within a wall of the gas line.

5. The welding system of claim 3, wherein the first gas line transducer is coupled to an outer surface of the body of the gas line.

6. The welding system of claim 1, wherein the radio signals are communicated based at least in part on an IEEE 802.11x-based Wi-Fi wireless standard, an IEEE 802.15.1 Bluetooth wireless standard, an IEEE 802.15.4 wireless standard, a cellular network standard, or any combination thereof.

7. The welding system of claim 1, wherein the gas line comprises a flexible gas line.

8. The welding system of claim 1, wherein the radio signals communicated by the first gas line transducer comprise biometric readings related to the operator of the welding system.

9. The welding system of claim 1, wherein the radio signals communicated by the first gas line transducer comprise data settings for components of the welding system.

10. The welding system of claim 1, comprising a second gas line transducer coupled to the gas line, wherein the first gas line transducer is proximate to a first end of the gas line, the second gas line transducer is proximate to a second end of the gas line opposite to the first end, and the first gas line transducer is configured to communicate with the second gas line transducer via the radio signals transmitted through the gas line.

11. A welding system comprising:
    a wire feeder of the welding system comprising communications circuitry and a gas port, wherein the gas port is configured to convey a gas for a welding or cutting operation; and a first gas line transducer coupled to the communications circuitry, wherein the first gas line transducer is configured to transmit radio signals into the gas port, the first gas line transducer is configured to receive radio signals from a second gas line transducer of a welding torch of the welding system, wherein the transmitted and received radio signals are conveyed by a gas line coupled to the gas port.

12. The welding system of claim 11, wherein the wire feeder comprises a housing configured to at least partially enclose the communications circuitry and the gas port, wherein the first gas line transducer is entirely disposed within the housing.

13. The welding system of claim 11, wherein the gas port is configured to couple with the gas line via a fitting, and the fitting comprises the first gas line transducer.

14. The welding system of claim 11, wherein the wire feeder is configured to connect with one or more of a welding power unit, a wire feeder, a gas supply system, a welding torch, a plasma cutting torch, a welding helmet, a compressor, a pneumatic tool, or any combination thereof via the gas line.

15. The welding system of claim 11, wherein the radio signals transmitted and received by the first gas line transducer comprise at least one of data settings for components of the welding system and biometric readings related to the operator of the welding system.

16. The welding system of claim 11, comprising:
the gas line comprising a first end coupled to the gas port of the wire feeder and a second end opposite the first end that is coupled to the welding torch; and
the second gas line transducer is configured to communicate with the first gas line transducer of the wire feeder through the gas line, wherein the first gas line transducer and the second gas line transducer are configured to communicate data settings for the wire feeder or the welding torch via the radio signals.

17. The welding system of claim 16, wherein the gas line comprises a flexible gas line.

18. A method of communicating between components of a welding system, comprising:
generating radio signals from a communications circuitry;
transmitting, from a first gas line transducer coupled to the communications circuitry, the radio signals into a gas line coupled between components of the welding system, wherein radio signals are transmitted into the gas line proximate to a first end of the gas line;
directing an angle of the transmitted radio signals to internally reflecting a portion of the radio signals within the gas line between the first end and a second end of the gas line;
receiving, at a second gas line transducer, the portion of the radio signals proximate to the second end of the gas line; and
transmitting, from the second gas line transducer, radio signals through the gas line, wherein the received radio signals correspond to data settings of the components of the welding system.

19. The method of claim 18, wherein the gas line coupled between the components comprises a flexible gas line.

20. The method of claim 18, wherein the components of the welding system comprise a welding power unit, a wire feeder, a gas supply system, a welding torch, a plasma cutting torch, a welding helmet, a compressor, a pneumatic tool, or any combination thereof.

* * * * *